2,751,426
Patented June 19, 1956

2,751,426

ETHYLATION OF OLEFINS

Rex D. Closson, Detroit, Alfred J. Kolka, Birmingham, and Waldo B. Ligett, Pontiac, Mich., assignors to Ethyl Corporation, New York, N. Y., a corporation of Delaware No Drawing. Application June 24, 1952,
Serial No. 295,353

1 Claim. (Cl. 260—683.15)

This invention relates to the ethylation of olefins and more particularly to interaction of ethylene with olefins containing allylic hydrogen atoms.

An object of this invention is to provide a new and improved catalytic method for the ethylation of olefins. A further object is to provide a new and improved catalytic method for the reaction of ethylene with acyclic olefins containing allylic hydrogen to produce ethylated derivatives.

We have discovered that ethylene can be made to react with acyclic olefins having at least one allylic hydrogen in the presence of a catalytic organo-alkali metal compound to produce compounds in which one or more allylic hydrogens of the acyclic olefin is replaced by an ethyl group. Thus, for example, ethylene reacts in the presence of catalytic quantities of our catalysts with olefins containing allylic hydrogen to produce olefins containing at least two more carbon atoms than the starting material. Thus, for example, when propylene and ethylene react in our process, pentenes are formed; when butenes, pentenes, octenes, nonenes and the like are reacted with ethylene, the products are hexenes, heptenes, decenes and undecenes. Similarly, higher acyclic olefins containing allylic hydrogen react with ethylene in our process to produce different olefins containing at least two additional carbon atoms.

As the olefin to be ethylated, liquid or gaseous acyclic olefins having at least one allylic hydrogen are satisfactory. By "allylic hydrogen" we mean hydrogen atoms directly attached to a carbon atom which is alpha to a carbon-to-carbon double bond. Examples include propylene, butene-1, butene-2, isobutylene, pentene-1, pentene-2, hexene-1, hexene-2, hexene-3, heptene-1, heptene-2, heptene-3, heptene-4, octene-1, octene-2, octene-3, octene-4, nonene-1, nonene-2, nonene-3, nonene-4, nonene-5, the various decenes, undecenes, and dodecenes having at least one allylic hydrogen, 3-methylbutene-1, 2-methylbutene-2, 3-methylpentene-1, 3-methylpentene-2, 4-methylpentene-1, 4-methylpentene-2, tetramethylethylene and the like.

The catalysts of our invention comprise organo-alkali metal compounds, particularly those compounds of an alkali metal atom and a hydrocarbon radical. The alkali metals include lithium, sodium, potassium, rubidium and cesium, with those of atomic weight greater than 7 being preferable for our purpose. Examples of our catalysts include aromatic-alkali metal compounds such as phenyl lithium, phenyl sodium, benzyl sodium, benzyl potassium, naphthyl potassium and the like; alkyl-alkali metal compounds such as ethyl lithium, butyl lithium, propyl sodium, ethyl sodium, amyl sodium, hexyl potassium, butyl cesium and the like; and alkenylalkali metal compounds such as sodio-butenes, sodio-propenes, sodio-pentenes, potassio-hexanes, potassio-butenes and the like. The alkenyl-alkali metal catalysts represent our preferred group.

Since oxygen reacts destructively with our catalysts, it is preferable that the alkylation reaction be carried out in substantially oxygen-free surroundings, and that reactants employed should be low, preferably below about 0.5 per cent, in oxygen content. However, our catalysts are effective oxygen scavengers and can be employed in the presence of greater quantities of oxygen, if the catalyst is present in amount in excess of the quantity consumed by oxygen.

The amount of catalyst to be employed is dependent to some extent upon the pressure of operation. At higher pressures somewhat smaller amounts of catalyst can be used than are preferable at lower pressures. Generally the amount of catalyst used should be about 0.01 to 10 per cent by weight of the amount of allylic olefin compound used, with best results obtained when the amount of catalyst is between 0.1 and 5 per cent by weight of the amount of allylic olefin.

Our reaction is operable at temperatures ranging from about 50 to 250° C. For best results it is preferred to operate at temperatures in the range of about 100 to 200° C.

Our invention is operable at any pressure within equipment limitations. For best results we prefer to operate at pressures from about 10 to 2,000 atmospheres. In the interest of economy, we prefer to operate in the range of about 10 to about 200 atmospheres pressure.

Our process is equally applicable to the alkylation of mixtures of allylic olefin compounds with ethylene. In this case, mixtures of products, which can be separated if desired by customary means, such as fractionation, are obtained.

The ratio of ethylene to allylic olefin compound can be varied over a wide range. Usually it is preferable to employ an excess over the stoichiometric amount of ethylene but in some cases, as when monoalkylation of an allylic olefin compound capable of polyalkylation is desired, it may be preferable to operate with a stoichiometric deficiency of ethylene.

Although we prefer to alkylate a substantially undiluted allylic olefin compound with substantially undiluted ethylene, it is within the scope of our invention to conduct our reaction with either or both of our reactants dissolved in a solvent. The solvent should be one which is inert to the alkylation reaction and which is substantially inert to attack by our alkali metal compound catalysts. Paraffins, cycloparaffins, and aromatic nucleus are examples of suitable solvent types. Specific examples include n-octane, isooctane, cyclohexane, benzene, tert-amylbenzene and tert-heptylbenzenes.

Under the reaction conditions which we employ it is possible for isomerization of double bonds to occur. For example, 1-pentene, when held at our temperatures and pressures in the presence of our catalysts, may be partially converted to 2-pentene. The same isomerization is possible with many of our other reactants and products. Also, many of the reactants and their isomerization counterparts have two non-equivalent allylic positions, ethylation of which would produce different ethylation products. For these reasons, practice of our invention usually leads to a mixture of products, rather than a single pure material. Fractional distillation and other standard means can be used to resolve these mixtures.

In commercial operation, it is particularly attractive to conduct our process in a continuous manner. This can be done by a variety of techniques, such as passing the reactants, either in the liquid or vapor state, or in mixed liquid-vapor state, over a fixed bed of catalyst, either substantially pure or admixed with an inert carrier. The product stream can be purified by distillation in a continuous fractionation column. Alternately, the liquid or liquid-vapor reaction can be carried out in the presence of a suspended catalyst which is transported through the reaction zone by the velocity of liquid reactants and products. In the vapor-phase reaction, the fluidized catalyst bed technique can be utilized; these and other continuous modifications of our invention can be carried out either "once-through" or with recycle of reactants and products. In continuous and batch modifications of our invention the reactants can be diluted with inert gases, such as propane, ethane, methane, nitrogen, helium, neon and the like.

The following examples will serve to further illustrate the scope and benefits of our invention.

Example I

A pressure autoclave having a removable cap for charging and discharging liquids and solids, equipped with a plurality of gas inlet and outlet lines, thermocouples, and pressure gauges and fitted with a mechanical agitator was flushed with nitrogen and charges with 470 parts of hexene-1 and 53 parts of sodio-hexene-1. Two hundred sixty parts of hexanes was present as a diluent. The autoclave was closed, heated to 100° C. and pressured to 27 atmospheres with ethylene. While maintaining the temperature of 100–182° C. and maintaining the pressure in the range 34 to 46 atmospheres by occasional re-pressuring with ethylene, the reaction was stirred for 1.25 hours. At the end of this time the autoclave was permitted to cool to room temperature, vented, and the catalyst remaining destroyed with a mixture of ethanol and water. The organic layer was washed with water, dried and distilled through a helices-packed fractionating column at atmospheric pressure. Distillation of such a reaction product led to a fraction of 26.8 parts (4.25 per cent yield) of a material boiling at 110–111° C./745 mm., having a refractive index, $n_D^{20}$, 1.4071, specific gravity, $d_4^{20}$, 0.7133, and bromine number 154.6. The corresponding properties for 3-ethylhexene-1 are: B. P., 110.3° C./760 mm., $n_D^{20}$, 1.407, $d_4^{20}$, 0.715, and bromine number 143. Further distillation led to a second fraction of 25.4 parts (4.05 per cent yield), having the following characteristics: B. P., 117.4–122.8° C./745 mm., $n_D^{20}$, 1.4125–1.4179, $d_4^{20}$, 0.7200–0.7295, bromine number 125–169. The range of the corresponding properties for the n-octenes is: B. P., 121.3–125.6° C./760 mm., $n_D^{20}$, 1.4088–1.4150, $d_4^{20}$, 0.7141–0.7243, bromine number 143.

This reaction gives satisfactory results when carried out at temperatures as low as 50° C. and as high as 250° C. Satisfactory results are also obtained when the pressure is varied between the range 10 atmospheres to 2000 atmospheres.

When the procedure of Example I is repeated using as catalyst ethyl sodium, ethyl lithium, ethyl potassium, ethyl cesium, ethyl rubidium, butyl lithium, butyl sodium, phenyl sodium, amyl sodium, hexyl potassium, potassium-1-butene, benzyl sodium, benzyl potassium and the like equally satisfactory results are obtained. When applied to other allylic olefins falling within the scope of our compounds such as hexene-2, hexene-3, pentene-1, pentene-2, pentene-3, butene-1, butene-2, propylene, isobutylene, octene-1, heptene-1, heptene-2, heptene-3, decene-1, dodecene-1 and the like result in good yields of the corresponding alkylated products. In cases where mixtures are obtained these can be separated by customary means such as fractional distillation or crystallization. Equally good results are obtained in the absence of a diluent.

Materials produced by the process of our invention are useful as chemical intermediates, fuels, fuel blending agents, fuel constituents, solvents, carriers for insecticides and the like.

We claim:

An ethylation process which comprises reacting acyclic olefin containing allylic hydrogen with ethylene at a temperature of 100° C. to 182° C. and a pressure of 34 to 46 atmospheres for a reaction time of up to 1.25 hours in the presence of an organo-alkali metal compound as catalyst.

References Cited in the file of this patent

UNITED STATES PATENTS

| | | |
|---|---|---|
| 2,466,694 | Freed | Apr. 12, 1949 |
| 2,492,693 | Freed | Dec. 27, 1949 |
| 2,548,803 | Little | Apr. 10, 1951 |

OTHER REFERENCES

Egloff: Chem. and Ind., April 3, 1937, page 325.